CONTACT CLOSURE CONVERSION CIRCUIT

Filed Oct. 14, 1966 3 Sheets-Sheet 1

INVENTOR
R. P. ANDERSEN
BY
Charles Scott Phelan
ATTORNEY

CONTACT CLOSURE CONVERSION CIRCUIT

Filed Oct. 14, 1966 3 Sheets-Sheet 2

United States Patent Office 3,513,333

Patented May 19, 1970

3,513,333

CONTACT CLOSURE CONVERSION CIRCUIT

Robert P. Andersen, Brooklyn, N.Y., assignor to Bell Telephone Laboratories, Incorporated, Murray Hill, N.J., a corporation of New York Filed Oct. 14, 1966, Ser. No. 586,776
Int. Cl. H03k 3/284
U.S. Cl. 307—273 8 Claims

ABSTRACT OF THE DISCLOSURE

A two-transistor circuit has an RC feedback path for clamping the circuit in an "off" state for a predetermined period commencing with an input switch contact closure and terminating after switch contact bounce ceases. Both transistors are cut off in response to the initial contact closure. A capacitor feeds a resulting output signal transition and subsequent decaying transient voltage back to the input transistor thereby establishing a decaying turn-on threshold voltage which prevents turn-on until the contact bounce ceases.

The invention is a transistor circuit that is more particularly described as a circuit for suppressing undesirable switch contact noise.

A contact closure conversion circuit is interposed between switch contacts, producing undesirable signal fluctuations, and a fast-response digital circuit. The contact conversion circuit suppresses the undesirable signal fluctuations so that they are not applied to the digital circuit. The switch contacts generally are opened and closed in response to primary on-off signals applied to a relay coil. As used hereinafter, contacts are considered to bounce when they do not close completely in one swing and are considered to chatter when they do not open completely in one swing. As the contacts close and bounce and as the contacts open and chatter, they produce undesirable secondary signal fluctuations, or noise, superimposed on the primary on-off signals. A circuit such as the previously mentioned digital circuit responds so fast that it can reproduce the undesirable secondary signal fluctuations as well as the primary on-off signals. The contact closure conversion circuit is interposed between the switch contacts and the digital circuit for producing uniform output voltage levels and a single transition even though input signals including contact bounce or contact chatter fluctuations are applied to the input of the conversion circuit. The digital circuit reproduces the primary on-off pulses in response to the uniform voltage levels produced by the contact closure conversion circuit.

In the prior art, a contact conversion circuit that is used for converting signals including contact bounce or chatter fluctuations into uniform bipolar voltage levels has an input filter that delays response of the conversion circuit so that an output signal transition occurs shortly after an initial input signal transient caused by closing a switch contact. Delaying the output signal transition introduces undesirable delay distortion, bias distortion, and jitter into the output signals produced by the prior art contact closure conversion circuit.

Under certain conditions, a monostable multivibrator may be used to convert signals including contact bounce or chatter fluctuations into clean voltage levels; however, such a multivibrator usually connat convert unipolar input signals to bipolar output voltage levels unless a level shifting amplifier stage is added to the multivibrator.

Therefore, it is an object of the present invention to improve the suppression of switch contact noise from signals to be applied to digital circuits.

Another object is to reduce time delay effects in output signals from a contact closure conversion circuit.

These and other objects of the invention are realized in an illustrative embodiment thereof in which an amplifier circuit produces a single output signal transition in response to and essentially coincident with an initial input signal transient caused by closing a switch contact or by opening a switch contact. A resistance-capacitance feedback path is provided for coupling the single output signal transition back to the input for assuring that the circuit changes state only once during a predetermined period commencing with the initial input signal transient. The RC feedback path may either include one or the other of two unique arrangements or both arrangements together. A first arrangement of the RC feedback path eliminates signal fluctuations that follow an initial negative-going swing of the input signal, and a second arrangement of the RC feedback path eliminates signal fluctuations that follow an initial positive-going swing of the input signal. When combined, the first and second arrangements of the RC feedback path eliminate signal fluctuations that follow both an initial positive-going and an initial negative-going swing of the input signal as caused by contact bounce and contact chatter. Regardless of contact bounce or chatter fluctuations in input signals, the circuit produces uniform bipolar output voltage levels for application to fast-operating digital circuits.

A feature of the invention is a two-transistor circuit having a resistance-capacitance feedback path for assuring that the circuit changes state only once during a predetermined interval greater than the duration of undesirable fluctuations that follow an initial negative-going swing of input signals.

Another feature is a two-transistor circuit having a resistance-capacitance feedback path for assuring the circuit changes state only once during a predetermined interval greater than the duration of undesirable fluctuations that follow an initial positive-going swing of input signals.

Another feature is a conversion of a switch contact closure signal to a uniform bipolar output signal having a single transition coincident with an initial input signal transient caused by a first closure of the switch contacts.

A further feature is a conversion of a switch contact closure signal to a uniform bipolar output signal having a single transition coincident with an initial input signal transient caused by a first opening of the switch contacts.

A better understanding of the invention may be derived from the detailed description following, if that description is considered with respect to the attached drawings in which.

Figure 1:
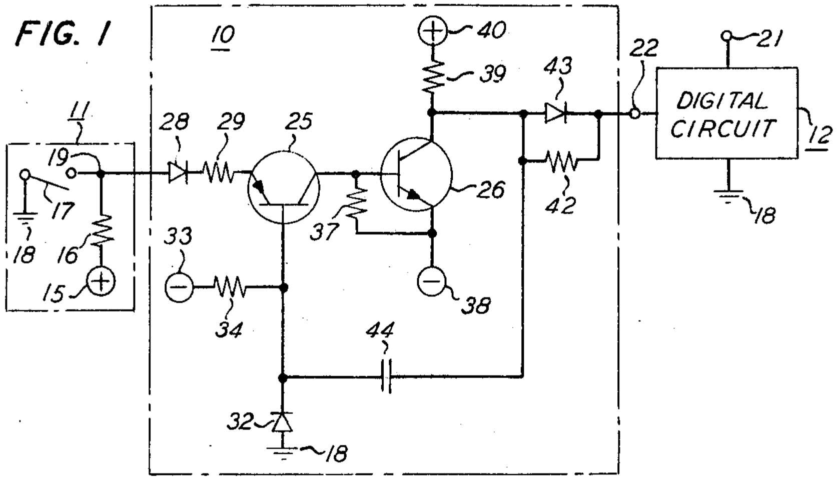
FIG. 1 is a schematic diagram of a first embodiment of a contact closure conversion circuit.

Referring now to FIG. 1, there is shown a schematic diagram of a first embodiment of a contact closure conversion circuit 10 interposed between a contact closure signal source 11 and a fast-response bipolar digital circuit 12. The contact closure conversion circuit 10 converts unipolar input pulses including switch contact bounce fluctuations, such as an input signal shown in FIG. 2, into uniform bipolar voltage levels, such as an output signal shown in FIG. 3. The digital circuit 12 is connected to the conversion circuit 10 so that the circuit 12 responds only to the output signal shown in FIG. 3.

In FIG. 1, the source 11 produces primary on-off pulses that include undesirable secondary signal fluctuations superimposed on the primary on-off pulses. The contact closure signal source 11 illustratively includes a grounded positive-potential source 15 coupled by way of a resistor 16 and switch contacts 17 to a ground reference potential 18. A relay winding not shown in FIG. 1 may advantageously be used to open and close the contacts 17 in response to primary on-off pulses applied to the relay winding by a source also not shown. Any pulse or fluctuation produced by the source 11 appears at a junction 19 between the resistor 16 and the switch contacts 17. One primary on-off pulse with superimposed secondary fluctuations is shown in FIG. 2 between the times $t_1$ and $t_4$.

Figure 2:
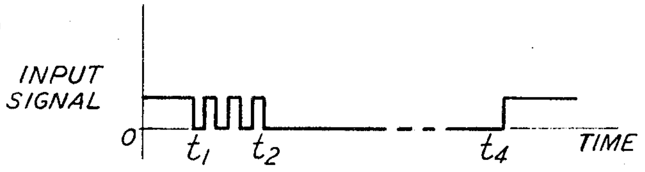
FIG. 2 is a waveform of a unipolar input signal that includes undesirable contact bounce fluctuations.

In FIG. 2, the switch contacts 17 initially close at time $t_1$. When the contacts are closing at time $t_1$, an initial input signal transient is produced in response to the first closure of the contacts 17. Starting at time $t_1$, the switch contacts 17 bounce and produce an input waveform that is a series of undesirable secondary fluctuations caused by switch contact bounce. These secondary fluctuations are superimposed upon the ground reference potential for a predetermined interval. The secondary fluctuations last through the duration of switch contact bounce, and they terminate at time $t_2$.

When opened at time $t_4$, the switch contacts 17 break without chatter and cause a uniform positive pulse having no undesirable fluctuations.

The fast-response bipolar digital circuit 12 is connected to the ground reference potential 18 and has a response time that is so fast that it can reproduce at an output terminal 21 the undesirable secondary fluctuations as well as the primary on-off pulses of waveforms such as illustrated in FIG. 2. That is, the fluctuations in the waveform of FIG. 2 have sufficient amplitude and duration to operate the digital circuit 12 if the waveform were applied directly to an input terminal 22 of the digital circuit 12. Therefore, a uniform pulse, such as the pulse of FIG. 3, is applied to the input terminal 22 so that the digital circuit 12 only responds to the primary on-off signals.

Figure 3:
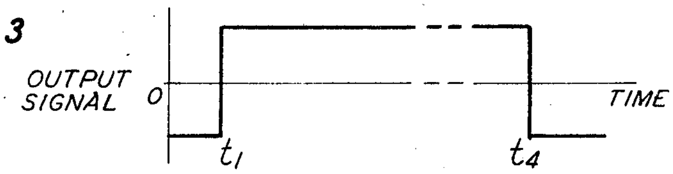
FIG. 3 is a waveform of a uniform bipolar output signal produced by the embodiment of FIG. 1 and characterized by a single transition coincident with an initial input signal transient caused by a contact closure.

The contact closure conversion circuit 10 includes a PNP driving transistor 25 and an NPN driven transistor 26 which produce the uniform primary on-off signal waveform shown in FIG. 3 in response to the input signal shown in FIG. 2.

In the input portion of the contact conversion circuit 10, input signals are coupled through a threshold diode 28 and a resistor 29 to the emitter electrode of the driving transistor 25. The ground reference potential 18 is coupled by way of a diode 32 to the base electrode of the transistor 25. In addition a grounded negative-potential source 33 is coupled through a resistor 34 to the base electrode of the transistor 25. The arrangement of transistor 25 is such that the transistor 25 operates in the linear region of its characteristics whenever it is conducting.

The input portion of the contact conversion circuit 10 is coupled to the output portion of that circuit so that the transistors 25 and 26 are either coincidently conducting or coincidently cut off. The collector electrode of the driving transistor 25 is directly connected to the base electrode of the driven transistor 26 to furnish enough base drive current so that the transistor 26 operates in saturation whenever it is conducting. A resistor 37 couples the base electrode of the transistor 26 to its emitter electrode, which is connected to a grounded negative-potential source 38.

A collector resistor 39 couples a grounded positive-potential source 40 to the collector electrode of the transistor 26. A parallel combination of a resistor 42 and a diode 43 provide alternative output paths having predetermined impedance values through which output signals are coupled from the contact conversion circuit 10 to the digital circuit 12. A capacitor 44 couples feedback signals from the collector of the driven transistor 26 to the base electrode of the driving transistor 25.

In operation, the transistors 25 and 26 of the contact conversion circuit 10 conduct when the contacts 17 are open and the positive potential of the waveform shown in FIG. 2 is applied through the diode 28 and resistor 29 to the emitter electrode of the transistor 25. During conduction the emitter current of the transistor 25 is approximately equal to the base drive current required to saturate the transistor 26 and is determined as follows:

$$I_{e25} \simeq \frac{V_{15}}{R_{16}+R_{29}}$$

where $I_{e25}$ is the minimum emitter current of the transistor 25, $V_{15}$ is the potential of source 15, and $R_{16}$ and $R_{29}$ are the resistances of the resistors 16 and 29. The maximum base current of the transistor 25 is determined from the ratio of the minimum current gain of that transistor to the maximum emitter current. The resistor 34 is limited to a resistance value less than or equal to the ratio of the potential of the source 33 to the maximum base current of the transistor 25. While the conversion circuit 10 conducts, the diode 32 clamps the potential on the base electrode of the transistor 25 to the ground reference potential 18. The capacitor 44 is charged between the ground potential on the base electrode of the transistor 25 and a negative potential of the source 38 which is coupled to the collector electrode of the conducting transistor 26.

Figure 4:
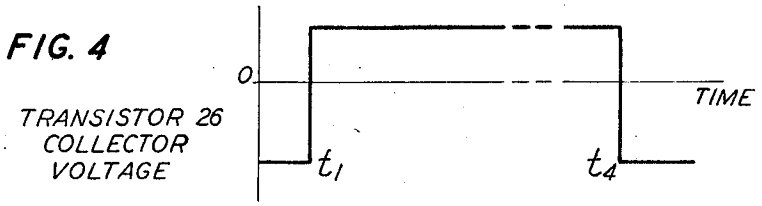
FIG. 4 is a waveform of a bipolar voltage signal produced within the embodiment of FIG. 1 and having a transition coincident with the initial input signal transient caused by a contact closure.

After the transistors 25 and 26 have been conducting, they are simultaneously cut off by the initial input signal transient caused by closing the switch contacts 17. As previously mentioned, this initial transient of the input signal is shown at time $t_1$ in FIG. 2. When the transistors 25 and 26 are cut off, the collector voltage of the transistor 26 makes a single positive-going transition. The collector voltage of the transistor 26 is shown in FIG. 4 where the positive-going transition is also shown at the time $t_1$. This positive-going transition shown in FIG. 4 is coupled from the collector of the transistor 26 in FIG.

Figure 5:
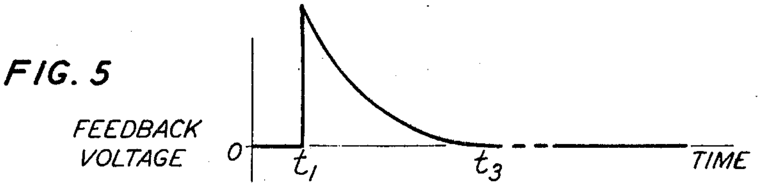
FIG. 5 is a waveform of a feedback voltage that clamps the embodiment of FIG. 1 in a cut-off state until undesirable contact bounce fluctuations cease in the input signal.

1 through the feedback capacitor 44 to the base electrode of the transistor 25. A feedback voltage waveform applied to the base electrode of the transistor 25 is shown in FIG. 5. A single positive-going transition shown in FIG. 5 occurs essentially simultaneously with both the single positive-going transition of the collector voltage shown in FIG. 4 and the initial input signal transient shown in FIG. 2. The voltage transition at time $t_1$ in FIG. 5 is applied to the base electrode of the driving transistor 25 to cooperate with the input signal applied to the emitter electrode of that transistor to reduce turn-off time of both transistors.

The resistor 34 and the capacitor 44 are selected to produce a decaying waveform shown in FIG. 5 between times $t_1$ and $t_3$. The capacitor 44 discharges through the resistor 34 toward the negative potential of the source 33. The time interval between times $t_1$ and $t_3$ represents the time in which the capacitor 44 discharges from a positive peak at time $t_1$ in FIG. 5 just to the ground reference potential. When the potential on the base electrode of the transistor 25 reaches the ground reference potential, the diode 32 conducts and terminates the discharge of capacitor 44. The discharge time is greater than the interval between the times $t_1$ and $t_2$ of FIG. 2 during which interval the undesirable contact bounce fluctuations are considered to expire. In FIG. 5, the decaying waveform produced by the resistor 34 and the capacitor 44 has sufficient amplitude and duration between the times $t_1$ and $t_3$ to insure that the transistor 25 remains in a cut-off state until after the contact bounce fluctuations have expired. After contact bounce fluctuations have ceased at the time $t_2$ in FIG. 2, the feedback voltage of FIG. 5 decays to the reference voltage so that a subsequent opening of the contacts 17 will cause the transistors 25 and 26 to conduct.

Since the transistors 25 and 26 are cut off coincidently, the transistor 26 also was cut off at time $t_1$ when the contacts 17 first closed. The transistor 26 is held in a cut-off state until the contacts 17 are opened again as a result of a primary input pulse change. The transistor 26 is initially held in a cut-off state because the transistor 25 is held in a cut-off state by the feedback voltage during the bounce interval. After the feedback voltage of FIG. 5 decays to the reference voltage at time $t_3$, the transistors 25 and 26 continue to be held in a cut-off state because the reference voltage is applied to the emitter and base electrode of the transistor 25. The reference voltage shown in FIG. 2 is applied through the diode 28 and the resistor 29 to the emitter electrode of the transistor 25 until the primary pulse change occurs at time $t_4$. The reference voltage shown in FIG. 5 is applied to the base electrode of the transistor 25 starting at time $t_3$. Therefore, as shown in FIG. 4, the collector voltage of the transistor 26 is either one of two discrete, or uniform bipolar levels of voltage regardless of the contact bounce fluctuations in the input signal of FIG. 2. When the contacts 17 are open, the voltage level on the collector electrode of the transistor 26 is essentially the potential of the negative-potential source 38. When the contacts 17 are closed, the voltage level on the collector electrode of the transistor 26 is essentially the potential of the positive-potential source 40 coupled through the resistor 39.

In the ouput portion of the conversion circuit 10, the voltage level on the collector of the transistor 26 is coupled either through the resistor 42 or through the diode 43 to the terminal 22. When the voltage on the collector electrode of the transistor 26 is negative, output current is conducted from the ground reference potential 18 (at the circuit 12) through the digital circuit 12, the resistor 42, and the transistor 26 to the negative-potential source 38. When the voltage on the collector electrode of the transistor 26 is positive, output current is conducted from the source 40 through the resistor 39, the diode 43, and the digital circuit 12 to the ground reference potential 18. The sources 38 and 40 together with the resistors 39 and 42 can be advantageously selected to provide predetermined impedance values and voltage levels for the primary on-off output signal waveform applied to the terminal 22.

The output signal waveform of FIG. 3 illustrates essentially equal amplitude positive and negative voltage levels for the primary on-off output signal waveform applied to the terminal 22. Such equal amplitude positive and negative voltage levels are produced when the supply voltage amplitudes of sources 38 and 40 are essentially equal and the reistance of resistors 39 and 42 are also essentially equal. The positive-going transient at time $t_1$ in FIG. 3 is, of course, esentially coincident with the initial input signal transient at time $t_1$ in FIG. 2.

The output signal waveform of FIG. 3 further illustrates that discrete voltage levels are produced for operating the digital circuit 12 regardless of the contact bounce fluctuations shown in the input signals of FIG. 2. The bipolar levels of the output signal are particularly useful when bipolar signals are required to operate the digital circuit 12.

Figure 6:
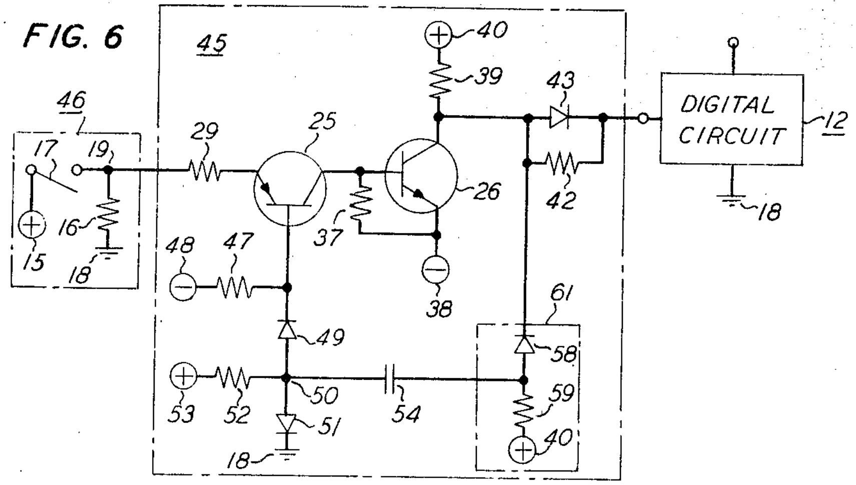
FIG. 6 is a schematic diagram of a second embodiment of a contact closure conversion circuit.

Referring now to FIG. 6, there is shown a schematic diagram of an embodiment of a contact closure converson circuit 45 that is interposed between a contact closure signal source 46 and the digital circuit 12. The contact conversion circuit 45 converts unipolar input pulses including switch contact fluctuations such as an input signal, shown in FIG. 7, into uniform bipolar voltage levels, such as an output signal shown in FIG. 8. The digital circuit 12 is connected to the contact conversion circuit 45 so that the digital circuit 12 responds only to the output signal shown in FIG. 8.

Figure 7:
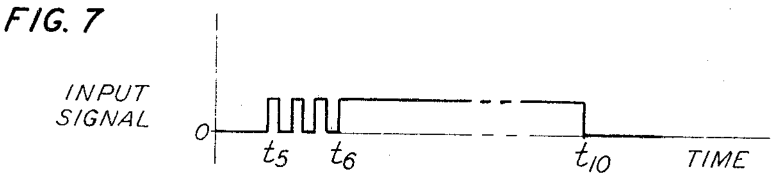
FIG. 7 is a waveform of a unipolar input signal that includes undesirable contact bounce fluctuations.
Figure 8:
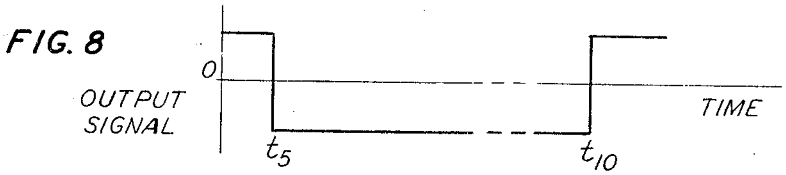
FIG. 8 is a waveform of a uniform bipolar output signal produced by the embodiment of FIG. 6 and characterized by a single transition coincident with an initial input signal transient caused by a contact closure.

In FIG. 6 the signal source 46 produces primary on-off pulses that include undesirable secondary signal fluctuations superimposed on the primary on-off pulses. These pulses are similar to the signals produced by the signal source 11 of the embodiment shown in FIG. 1 except that the grounded positive potential source 15 is connected to the contacts 17 and the resistor 16 couples the terminal 19 to the reference potential 18. Therefore, the source 15 and the reference potential 18 have been interchanged, and contact bounce fluctuations superimposed on primary on-off pulses commence in response to a positive-going leading edge of each primary on-off pulse One primary on-off pulse with superimposed secondary fluctuations from the signal source 46 is shown in FIG. 7 between the times $t_5$ and $t_{10}$. In FIG. 7 the switch contacts initially close at time $t_5$. When the contacts are closing at time $t_5$, an initial input signal transient is produced in response to the first closing of the contacts 17. Starting at time $t_5$, the switch contacts bounce and produce an input waveform that is a series of undesirable secondary fluctuations caused by the switch contact bounce. These secondary fluctuations are superimposed upon the positive potential from the potential source 15 for a predetermined interval that lasts through the duration of the switch contact bounce and terminates at time $t_6$.

Since the circuit shown in FIG. 6 is used to correct for undesirable fluctuations occurring after a positive-going swing of the input signal, such as at time $t_5$ in FIG. 7, the switch contacts are, for illustrative purposes, assumed to open without chatter at time $t_{10}$. Thus, starting at time $t_{10}$ in FIG. 7, the switch contacts open without chattering and produce a uniform ground reference potential signal having no undesirable fluctuations.

The embodiment of the contact conversion circuit 45, shown in FIG. 6, is very similar to the conversion circuit 10 of FIG. 1 except for changes in the input portion and the feedback loop. These changes have been made to hold the circuit in conduction during the undesirable input signal fluctuations. A fast-rise-time circuit 61 is included to show an arrangement for improving the rise time of output signals. In the input portion, diode 28, used to establish an input threshold in the embodiment of FIG. 1, has been omitted from the embodiment of FIG. 6 because diodes 49 and 51 inserted in the feedback loop establish a suitable threshold. The negative-potential supply 33, a resistor 34, and a capacitor 44 of FIG. 1 have been replaced in FIG. 6 by a resistor 47, a grounded negative-potential source 48, and a feedback capacitor 54 all of which are used to produce a decaying feedback signal shown in FIG. 10 for eliminating the undesirable fluctuations shown in FIG. 7. The resistor 47 couples the base electrode of the transistor 25 to the source 48. A terminal 50 is coupled through the diode 49 to the base electrode of the transistor 25 and through the diode 51 to the ground reference potential 18. The diode 51 is poled to conduct toward the reference potential 18. The anodes of the two diodes 49 and 51 are connected together at the terminal 50 which is also coupled through a resistor 52 to a grounded positive-potential source 53. In addition, the terminal 50 is coupled to the collector electrode of the transistor 26 by the feedback capacitor 54 and a diode 58 of the fast-rise-time circuit 61. The diode 49 is poled to conduct toward the base electrode of the transistor 25 and thereby prevent the capacitor 54 from creating a path to integrate signals in the conversion circuit 45.

In the fast rise-time circuit 61, the diode 58 and a resistor 59 connected in series circuit couple the positive-potential source 40 to the collector electrode of the transistor 26 for improving the rise-time characteristic of the feedback circuit. The diode 58 and the resistor 59 provide a path that is isolated from the influence of the capacitor 54 for rapidly increasing the potential on the collector electrode of the transistor 26 when that transistor is initially cut off. The circuit 61 is, however, not required in the embodiment of FIG. 6 when rise-time of the circuit 45 is brief enough for proper operation of the circuit 12. When the circuit 61 is omitted from the embodiment of FIG. 6, the capacitor 54 is connected directly to the collector electrode of the transistor 26.

In operation the transistors 25 and 26 of the contact conversion circuit 45 are cut off when the contacts 17 are open, and the ground reference potential of the waveform shown in FIG. 7 is applied through the resistor 29 to the emitter electrode of the transistor 25. When the transistors are cut off, the diode 51 clamps the potential on the terminal 50 essentially to the ground reference potential 18. The capacitor 54 is charged by the potential on the terminal 50 and the positive potential of the source 40 through the resistor 59.

Figure 9:
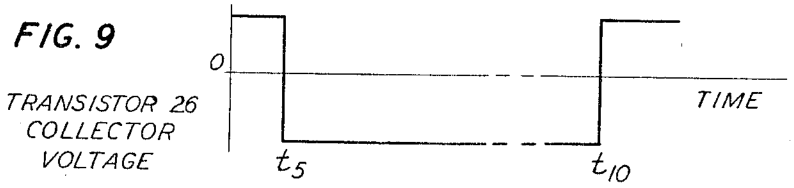
FIG. 9 is a waveform of a bipolar voltage signal produced within the embodiment of FIG. 6 and having a transition coincident with the initial input signal transient caused by a contact closure.
Figure 10:
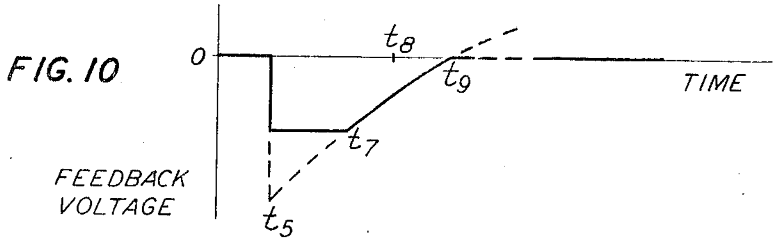
FIG. 10 is a waveform of a feedback voltage that holds the embodiment of FIG. 6 in a conducting state until undesirable contact bounce fluctuations cease in the input signal.

After the transistors 25 and 26 have been cut off, they are simultaneously turned on by the initial input signal transient caused by closing the switch contacts 17. As previously mentioned, this initial transient of the input signal is shown at time $t_5$ in FIG. 7. When the transistors 25 and 26 are turned on, the collector voltage on the transistor 26 makes a single negative-going transition. The collector voltage of the transistor 26 is shown in FIG. 9 where the negative-going transition is also shown at time $t_5$. This negative-going transition shown in FIG. 9 is coupled from the collector of the transistor 26 by way of the diode 58 and the feedback capacitor 54 to the terminal 50. A feedback waveform applied to the terminal 50 is shown in FIG. 10 as a dotted line waveform. A feedback voltage waveform applied to the base electrode of the transistor 25 is shown as a solid line waveform in FIG. 10. A negative-going transition, shown in FIG. 10 and applied to both the terminal 50 and the base electrode of the transistor 25, occurs essentially at the time $t_5$. Since voltage transition at time $t_5$ in FIG. 10 is applied by way of the terminal 50 to the anode of the diode 49, the diode 49 is thereby cut off. Thus, as shown by the solid line at time $t_5$ in FIG. 10, a negative potential from the source 48 is coupled to the base electrode of the driving transistor 25 to cooperate with the input signal applied to the emitter electrode of that transistor for turning on the transistors.

As soon as the transistors are turned on, the resistors 47 and 52, the potential sources 48 and 53, and the capacitor 54 produce a decaying waveform shown in FIG. 10 between the times $t_5$ and $t_9$. This decaying waveform is produced at the terminal 50 and is in part applied to the base electrode of the transistor 25. The high negative peak at time $t_5$ is sufficient to cut off the diodes 49 and 51. The diode 49 remains cut off until the potential on terminal 50 decays essentially to the potential of the source 48. The potential on terminal 50 decays essentially to the potential of the source 48 as a result of the capacitor 54 having its charge changed to a new polarity in a path including the positive-potential source 53, the resistor 52, the capacitor 54, the diode 58, the saturated transistor 26, and the negative-potential source 38. This decay occurs in the interval between times $t_5$ and $t_7$ in FIG. 10, during which interval the potential of the source 48 is coupled to the base electrode of the transistor 25 as shown by the solid line in FIG. 10.

As the potential on the terminal 50 increases positively above the potential of the source 48, the diode 49 conducts, thereby creating a voltage divider comprising the resistors 47 and 52. This voltage divider has a Thévenin equivalent voltage and impedance (determined by separating the supplies 48 and 53 together with the resistors 47 and 52 from the remaining circuit).

The potential on the terminal 50 decays from the potential of the source 48 toward the Thévenin equivalent voltage (slightly positive with respect to the ground reference potential) as the capacitor 54 discharges through the Thévenin equivalent impedance. As shown in FIG. 10, the potential on the terminal 50 continues to decay until time $t_9$ when the diode 51 is biased to conduct and thereby clamp the potential of the terminal 50 essentially to the ground reference potential. The solid line waveform shown between times $t_7$ and $t_9$ in FIG. 10 shows the potential existing on the terminal 50 and applied through the diode 49 to the base electrode of the transistor 25. This decaying waveform holds the transistors 25 and 26 conducting as long as the potential on the base electrode of the transistor 25 is negative enough to cause the transistor 25 to produce sufficient output current to keep the transistor 26 operating in saturation even though the input signal fluctuates to the reference potential. The discharge interval shown in FIG. 10 between the times $t_5$ and $t_8$ (the time when the transistor 25 would fail to supply sufficient base current to the transistor 26 if the input signal fluctuated to the reference potential) is greater than the interval shown in FIG. 7 between the times $t_5$ and $t_6$ during which the undesirable input signal fluctuations are considered to expire. After the contact bounce fluctuations have ceased at the time $t_6$ shown in FIG. 7, the feedback voltage of FIG. 10 decays to the reference voltage so that a subsequent opening of the contact 17 would cut off the transistors 25 and 26.

At time $t_{10}$ in FIG. 7, the contacts 17 open and cut off the transistors 25 and 26. When the transistors are cut off, the potential on the collector electrode of transistor 26 rises as shown at time $t_{10}$ in FIG. 9. The diode 58 provides a path for rapidly increasing the potential on the collector electrode of the transistor 26 while the capacitor 54 is charged between the potential on the terminal 50 and the potential of the source 40.

Figure 11:
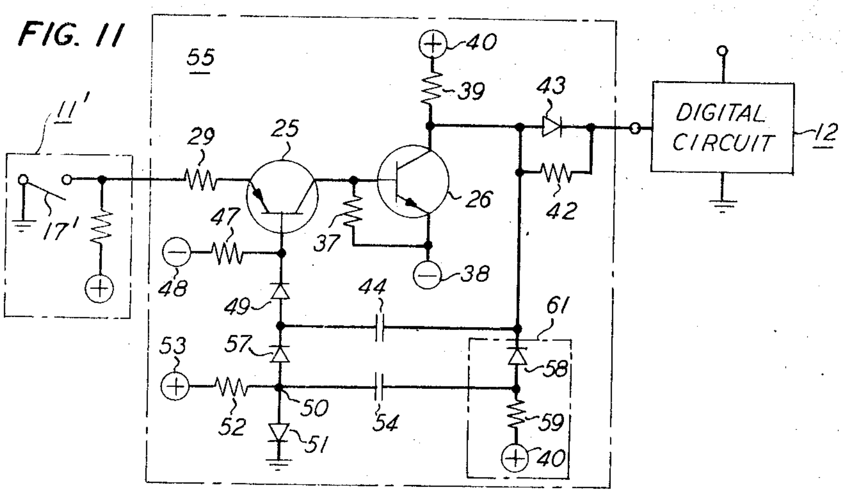
FIG. 11 is a schematic diagram of a third embodiment of a contact closure conversion circuit.

Referring now to FIG. 11, there is shown a schematic diagram of an embodiment of a contact closure conversion circuit 55 interposed between a contact closure signal source 11′ and a digital circuit 12. The contact closure conversion circuit 55 converts unipolar input pulses including switch contact fluctuations, such as the input signal shown in FIG. 12, into uniform bipolar voltage levels, such as an output signal shown in FIG. 13. The digital circuit 12 is connected to the contact conversion circuit 55 so that the circuit 12 responds only to the output signal shown in FIG. 13.

Figure 12:
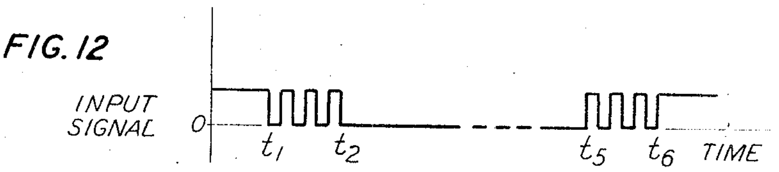
FIG. 12 is a waveform of a unipolar input signal that includes undesirable contact bounce and contact chatter fluctuations.
Figure 13:
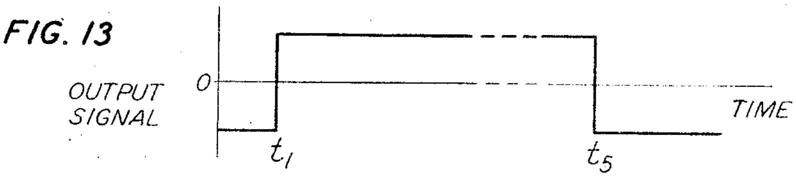
FIG. 13 is a waveform of a uniform bipolar output signal produced by the embodiment of FIG. 11.

In FIG. 11 the source 11′ produces primary on-off pulses that include undesirable secondary signal fluctuations superimposed on the primary on-off pulses. These primary on-off pulses are a combination of the signals produced by the signal source 11 of FIG. 1 and the signals produced by the signal source 46 of FIG. 6. The combination pulses are produced by a circuit similar to the source 11 of FIG. 1 except that switch contacts 17' are substituted for the switch contacts 17 used in FIG. 1. The contacts 17' not only bounce upon being closed, but they also chatter when opened. One combination primary on-off pulse with superimposed secondary fluctuations is shown in FIG. 12. In FIG. 12 the switch contacts initially close in response to a change in the primary drive signal applied to the relay of contacts 17' at time $t_1$. Also in FIG. 12 the switch contacts open in response to a further change in the primary drive signal applied to the relay at time $t_5$. Input signal changes in FIG. 12 at times other than time $t_1$ or $t_5$ result from relay contact bounce or chatter. When the contacts close and open during bounce and chatter, they produce in the input signal waveform a series of undesirable secondary fluctuations. Fluctuations are superimposed on the ground reference voltage between the times $t_1$ and $t_2$ because the switch contacts bounce after being closed at time $t_1$. Fluctuations are superimposed on the positive input signal voltage between the times $t_5$ and $t_6$ because the switch contacts chatter after being opened at time $t_5$. It is noted that the secondary fluctuations caused by chatter between times $t_5$ and $t_6$ in FIG. 12 have characteristics like the characteristics of the waveform of FIG. 7 between the times $t_5$ and $t_6$. The contact closure conversion circuit 55 of FIG. 11 is similar to the contact closure conversion circuit 45 of FIG. 6 with the exception of additional components which have been inserted. These additional components are analogous to components of the contact closure conversion circuit 10 of FIG. 1.

In FIG. 11 a diode 57 is inserted so that its anode is connected to terminal 50 and its cathode is connected to the anode of the diode 49. The capacitor 44, which was shown in the embodiment of FIG. 1, is inserted between the collector electrode of the transistor 26 and the cathode of the diode 57. Thus in FIG. 11 the diodes 49 and 57 couple the base electrode of the transistor 25 to the terminal 50 in a manner similar to the coupling of that base electrode to the ground reference potential by way of the diode 32 shown in the embodiment of FIG. 1. The capacitor 44 couples the collector electrode of the transistor 26 to the cathode of the diode 57 in a manner similar to the coupling of that collector electrode by the capacitor 44 to the cathode of the diode 32 in the embodiment of FIG. 1.

In the fast rise-time circuit 61, the diode 58 and the resistor 59, connected in series circuit couple the positive-potential source 40 to the collector electrode of the transistor 26 for improving the rise time characteristic of the feedback circuit. The diode 58 and the resistor 59 provide a path that is isolated from the influence of the capacitors 44 and 54 for rapidly increasing the potential on the collector electrode of the transistor 26 when that transistor is initially cut off. The circuit 61 is, however, not required in the embodiment of FIG. 11 when rise time of the circuit 55 is brief enough for proper operation of the digital circuit 12. When the circuit 61 is omitted from the embodiment of FIG. 11, the capacitors 44 and 54 are both connected directly to the collector electrode of the transistor 26.

In operation the transistors 25 and 26 conduct when the contacts 17' are open and are cut off when the contacts 17' are closed. The diodes 49 and 57 always clamp the potential of the base electrode of the transistor 25 to the potential on the terminal 50 except for the interval in which the potential of the terminal 50 is more negative than the potential of the source 48.

Figure 14:
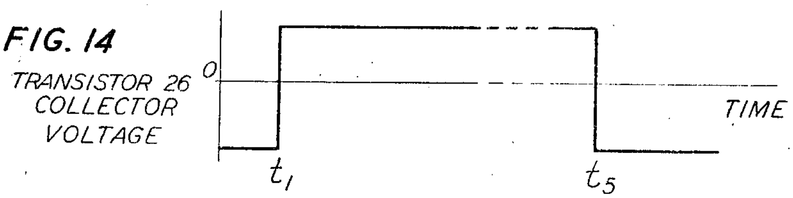
FIG. 14 is a waveform of a bipolar voltage signal produced within the embodiment of FIG. 11.
Figure 15:
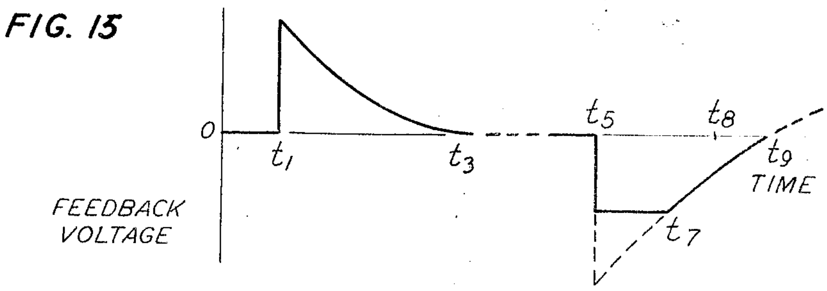
FIG. 15 is a waveform of a feedback voltage that clamps the embodiment of FIG. 11 in a cut-off state during contact bounce and holds the embodiment of FIG. 11 in a conduction state during contact chatter.

When the transistors are conducting, the capacitors 44 and 54 are charged between the reference potential on terminal 50 and the negative potential of the source 38 which is coupled to the collector electrode of the transistor 26. When the transistors are cut off by the initial transient caused by closing the contacts 17', the collector potential on the transistor 26 makes a positive-going transition at time $t_1$. The potential on the collector electrode of the transistor 26 is shown in FIG. 14. The positive-going transition is coupled through the capacitor 44 and the diode 49 and is applied essentially at time $t_1$ to the base electrode of the transistor 25. The signal coupled to the base electrode of the transistor 25 is shown as a solid line waveform in FIG. 15. The positive transition at time $t_1$ and the decaying waveform between times $t_1$ and $t_3$ in FIG. 15 cooperate with the input signal to cut off the transistors 25 and 26 and hold them in a cut-off condition in the manner similar to the operation of the embodiment of FIG. 1.

In the embodiment of FIG. 11, the capacitor 44 has its charge changed through the resistor 47 in a manner similar to its change of charge in the embodiment of FIG. 1 through the resistor 34. When the transistors are cut off, the charge stored in the capacitor 54 is discharged through the diode 51, and the capacitor 54 is thereafter charged between the potential on the terminal 50 and the positive potential of the source 40 coupled through the resistor 59. While the transistors 25 and 26 remain cut off, the capacitor 44 charges between the potential on the terminal 50 and the positive potential of the source 40 as coupled to the collector electrode of transistor 26.

When the transistors 25 and 26 are once again turned on by the initial transient caused by opening the contacts 17', the collector potential on the transistor 26 makes a negative-going transition as shown at time $t_5$ in FIG. 14. This negative-going transition is coupled through the capacitors 44 and 54 and is applied to the terminal 50. The diodes 49 and 51 are thereby cut off, and a negative potential from the source 48 is coupled to the base electrode of the transistor 25 to maintain conduction through the transistors in a manner similar to the operation of the embodiment of FIG. 6 between times $t_5$ and $t_9$. The charge on the capacitors 44 and 54 decays as the capacitors discharge through the resistor 52 from time $t_5$ until time $t_7$ when the potential on the terminal 50 essentially reaches the potential of the source 48. Thereafter the diode 49 conducts, and the capaicotrs 44 and 54 discharge through the resistors 47 and 52 until time $t_9$ when the terminal 50 returns essentially to the ground reference potential 18. The discharge of the capacitors 44 and 54 is through the Thévenin equivalent circuit described for the embodiment of FIG. 6.

The above-detailed description is illustrative of three embodiments of the invention, and it is to be understood that additional embodiments thereof will be obvious to those skilled in the art. These additional embodiments are considered to be within the scope of the invention.

What is claimed is:

1. A circuit comprising driving and driven transistors arranged for coincidental conduction in a first state and coincidental cut-off in a second state in response to input pulses, signal source means applying to an emitter electrode of the driving transistor a series of unipolar input pulses, each having interspersed signal fluctuations for a predetermined interval commencing with an initial input signal transient, bipolar means biasing the driven transistor for producing bipolar output signals, means responsive to each initial input signal transient for changing the state of the transistors, the driven transistor and biasing means producing at a collector electrode of the driven transistor an output signal transition coincident with each initial input signal transient, feedback means coupling each output signal transition from the collector electrode to a base electrode of the driving transistor for ensuring only one change of state in the driving and driven transistors during the predetermined interval,
a capacitor included in the feedback means for coupling the collector electrode of the driven transistor to a base electrode of the driving transistor,
a resistor connected to the base electrode of the driving transistor for discharging the capacitor,
a source of reference potential,
a unipolar conduction device coupling the reference potential to the base electrode of the driving transistor,
the initial input signal transient is a leading edge of each of the input pulses, and
the driven transistor produces an output signal transition coincident with the leading edge of each of the input pulses.

2. A circuit comprising
driving and driven transistors of opposite conductivity types arranged for coincidental conduction in a first state and coincidental cut-off in a second state in response to input pulses,
signal source means including switch contacts applying to an emitter electrode of the driving transistor a series of unipolar input pulses, each having interspersed signal fluctuations for a predetermined interval commencing with an initial input signal transient occurring at the leading edge of the input pulses,
means responsive to each initial input signal transient for changing the state of the transistors, the driven transistor producing at a collector electrode of the driven transistor a different output signal transition coincident with each initial input signal transient,
a resistor-capacitor feedback means coupling each output signal transition from the collector electrode to a base electrode of the driving transistor for ensuring only one change of state in the driving and driven transistors during the predetermined interval, said feedback means having a discharge time greater than the predetermined interval,
bipolar means biasing the driven transistor for producing bipolar output signals, each making a bipolar transition coincident with the leading edge of each of the input pulses,
a capacitor included in the feedback means for coupling the collector electrode of the driven transistor to the base electrode of the driving transistor,
a voltage divider having an intermediate terminal coupled to the base electrode of the driving transistor for discharging the capacitor,
a source of reference potential, and
a unilateral conduction device coupling the intermediate terminal to the reference potential.

3. A circuit in accordance with claim 2 in which
the bipolar biasing means comprises
a first potential source supplying a first polarity potential to the collector electrode of the driven transistor, and
a second potential source supplying a second polarity potential to an emitter electrode of the driven transistor.

4. A circuit comprising
driving and driven transistors arranged for coincidental conduction in a first state and coincidental cut-off in a second state in response to input pulses,
signal source means applying to an emitter electrode of the driving transistor a series of unipolar input pulses, each having interspersed signal fluctuations for a predetermined interval commencing with an initial input signal transient,
bipolar means biasing the driven transistor for producing bipolar output signals,
means responsive to each initial input signal transient for changing the state of the transistors, the driven transistor and biasing means producing at a collector electrode of the driven transistor an output signal transition coincident with each initial input signal transient,
feedback means coupling each output signal transition from the collector electrode of the driven transistor to a base electrode of the driving transistor for ensuring only one change of state in the driving and driven transistors during the predetermined interval,
the driven transistor produces on said collector electrode a first output signal transition coincident with an initial leading-edge of each input pulse,
the driven transistor produces on said collector electrode a second output signal transition coincident with an initial trailing-edge of each input pulse,
a first feedback means coupling the first output signal transition from said collector electrode to said base electrode for maintaining conduction through the driving and driven transistors during a conduction interval greater than a predetermined interval commencing with the initial leading-edge of each input pulse, and
a second feedback means coupling the second output signal transition from said collector electrode to said base electrode for disabling conduction through the driving and driven transistors during a cut-off interval greater than a predetermined interval commencing with the initial trailing-edge of each input pulse.

5. A circuit in accordance with claim 4 in which
the signal source includes switch contacts applying to the driving transistor a series of unipolar input pulses having first interspersed signal fluctuations during the predetermined interval commencing with the trailing-edge of each of the input pulses and second interspersed signal fluctuations during the predetermined interval commencing with the leading-edge of each of the input pulses, and
means bias the driven transistor for producing bipolar output signals each having a first transition coincident with the leading-edge of each of the input pulses and a second transition coincident with the trailing-edge of each of the input pulses.

6. A circuit in accordance with claim 5 in which
the driving and driven transistors of opposite conductivity types,
the first feedback means is a resistor-capacitor circuit having a discharge time greater than the conduction interval, and
the second feedback means is a resistor-capacitor circuit having a discharge time greater than the cut-off interval.

7. A circuit in accordance with claim 6 further comprising
a first capacitor coupling a collector electrode of the driven transistor to a base electrode of the driving transistor,
a voltage divided including a resistor connected to the base electrode of the driving transistor and including an intermediate terminal,
a source of reference potential,
a first unilateral conduction means coupling the intermediate terminal to the reference potential,
a second capacitor coupling the collector electrode of the driven transistor to the intermediate terminal,
a second unilateral conduction means included within the voltage divider and coupling the intermediate terminal to the first capacitor and the base electrode of the driving transistor, and
a third unilateral conduction means included within the voltage divider and coupling the first capacitor and the second unilateral conduction means to the base electrode of the driving transistor.

8. A circuit in accordance with claim 6 in which
the bipolar biasing means comprises
a first potential source supplying a first polarity potential to the collector electrode of the driven transistor, and a second potential source supplying a second polarity potential to an emitter electrode of the driven transistor.

References Cited

UNITED STATES PATENTS

| | | | |
|---|---|---|---|
| 2,769,907 | 11/1956 | Lohman | 307—313 |
| 2,864,007 | 12/1958 | Clapper | 307—255 |
| 3,215,852 | 11/1965 | Brode et al. | 307—273 |
| 3,233,118 | 1/1966 | Jensen | 307—233 |
| 3,388,265 | 6/1968 | Wright | 307—235 |

JOHN S. HEYMAN, Primary Examiner

H. A. DIXON, Assistant Examiner

U.S. Cl. X.R.

307—288